United States Patent [19]

Into

[11] Patent Number: 5,734,438
[45] Date of Patent: Mar. 31, 1998

[54] KEY SIGNAL WAVEFORM SHAPING APPARATUS

[75] Inventor: Shozo Into, Kanagawa, Japan

[73] Assignee: Sony Corporation, Japan

[21] Appl. No.: 574,852

[22] Filed: Dec. 19, 1995

[30] Foreign Application Priority Data

Dec. 21, 1994 [JP] Japan ................ 6-318504

[51] Int. Cl.$^6$ .................. H04N 9/74; H04N 9/75
[52] U.S. Cl. .................. 348/590; 348/597
[58] Field of Search .................. 348/590, 587, 348/591–597; 345/113, 114; H04N 9/74, 9/75

[56] References Cited

U.S. PATENT DOCUMENTS

| | | | |
|---|---|---|---|
| 4,930,004 | 5/1990 | Yamamoto et al. | 348/590 |
| 4,947,255 | 8/1990 | Jackson et al. | 348/590 |
| 4,967,277 | 10/1990 | Chaplin | 348/590 |
| 4,970,595 | 11/1990 | Bloomfield | 348/590 |
| 5,051,828 | 9/1991 | Chaplin | 348/590 |
| 5,146,315 | 9/1992 | Muller | 348/587 |
| 5,146,334 | 9/1992 | Fukatsu et al. | 348/590 |
| 5,313,304 | 5/1994 | Chaplin | 348/590 |
| 5,369,443 | 11/1994 | Woodham | 348/590 |
| 5,416,529 | 5/1995 | Lake | 348/590 |

*Primary Examiner*—Tommy P. Chin
*Assistant Examiner*—Luanne D. Din
*Attorney, Agent, or Firm*—Ronald P. Kananen

[57] ABSTRACT

In a key signal waveform shaping apparatus which includes an adder 1 for supplying a key source signal KS with a gain of a predetermined slice level, a multiplier 2 for extending a signal offset by the adder 1 by multiplication of a gain, and a first limiter circuit 3 for converting the signal extended by the multiplier 2 by cutting an upper limit value and lower limit value of the extended signal. A limit value generating circuit generates an upper limit value and lower limit value from the signal offset by the adder 1. The key signal K is obtained by further limiting the output of the first limiter circuit 3 by the upper limit value and the lower limit value. The present invention provides a key signal waveform shaping apparatus in which an error of an edge position of a key signal can be removed and in which the quality of a synthesized picture can be improved.

14 Claims, 10 Drawing Sheets

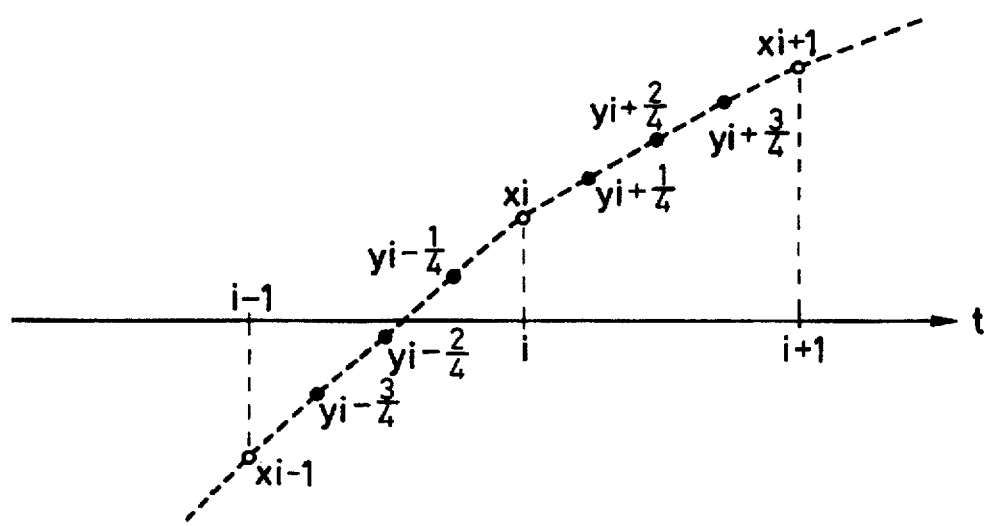
FIG. 4A  Over-Sampling
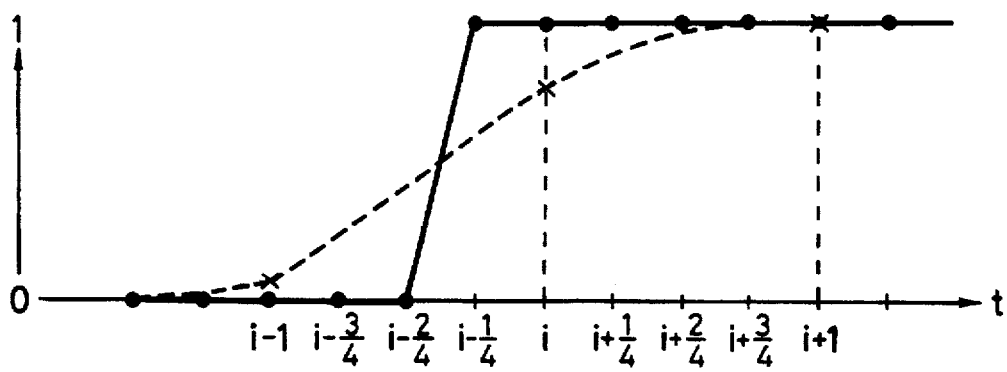
FIG. 4B  1-Bit Hard Key
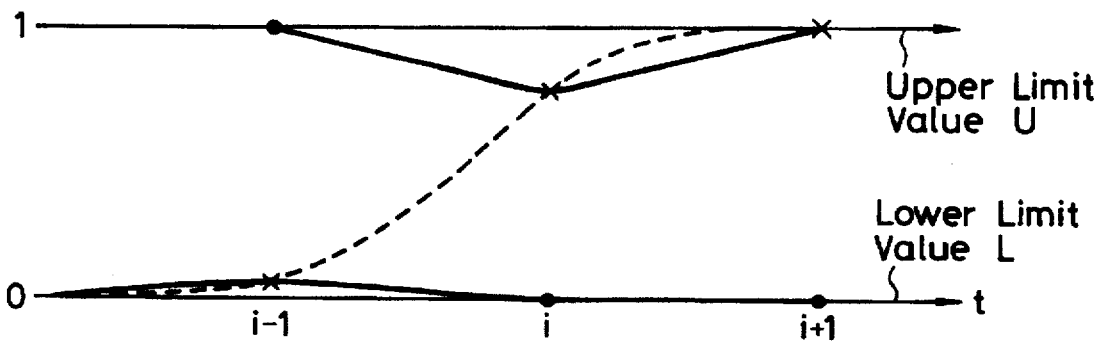
FIG. 4C  Upper Limit Value and Lower Limit Value Double-Side Type Single-Side Type

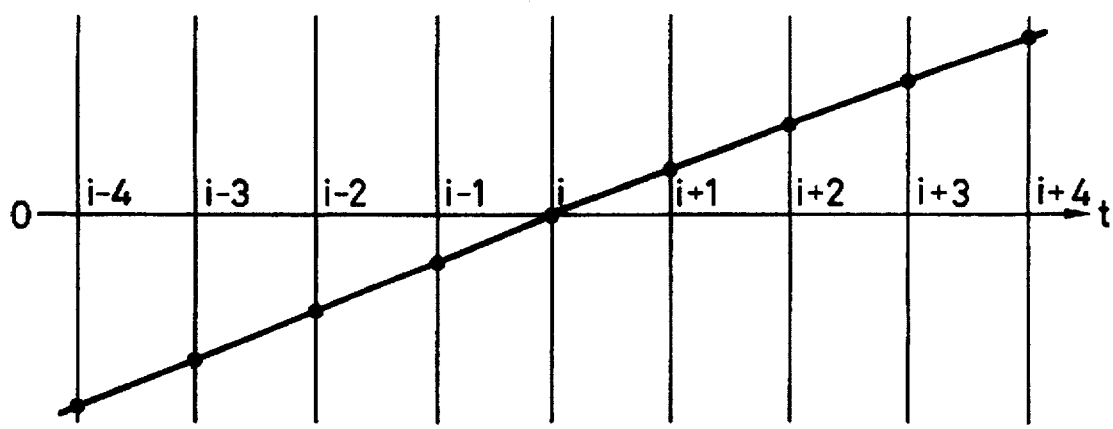
F I G. 7A Offset Key Source Signal
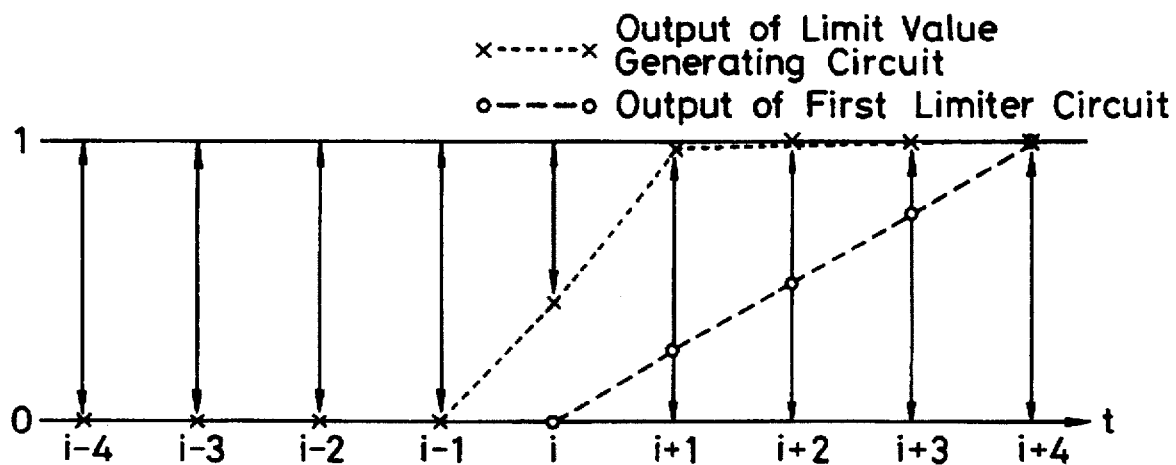
F I G. 7B Limiter Signal
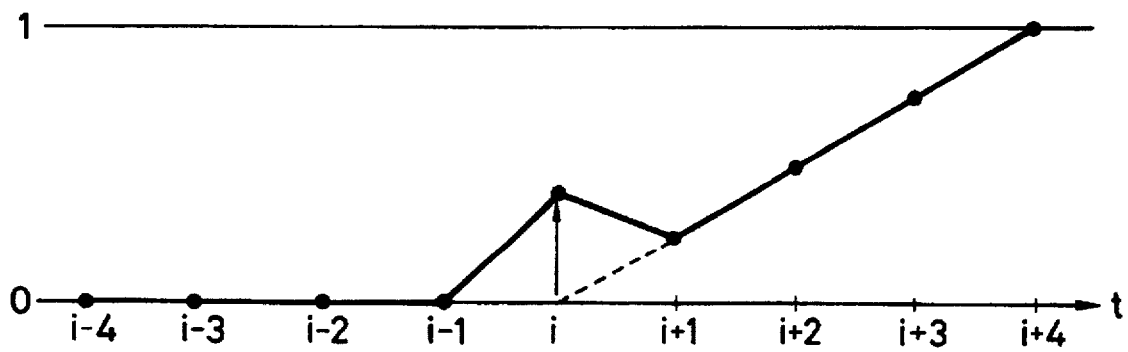
F I G. 7C Key Signal

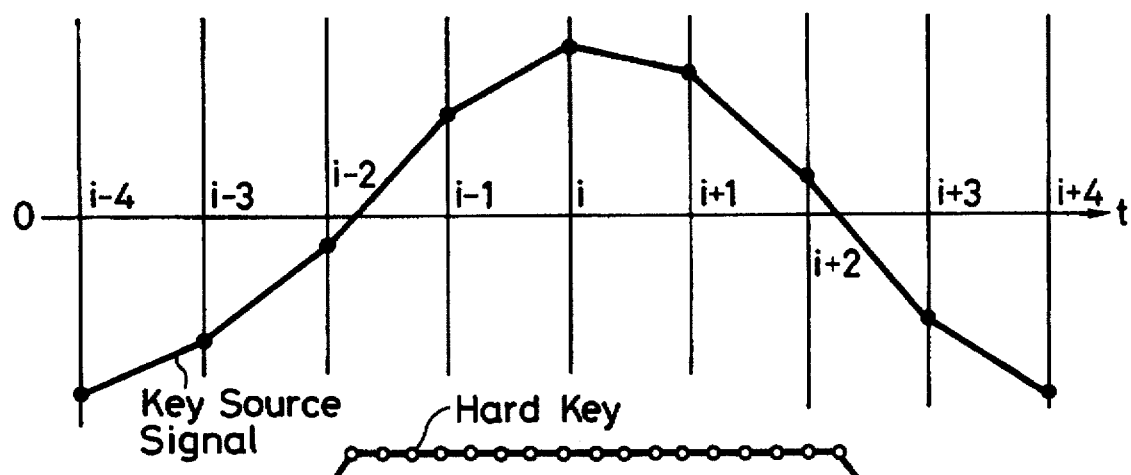
FIG. 9A  Key Source Signal and Hard Key to be Over-Sampled
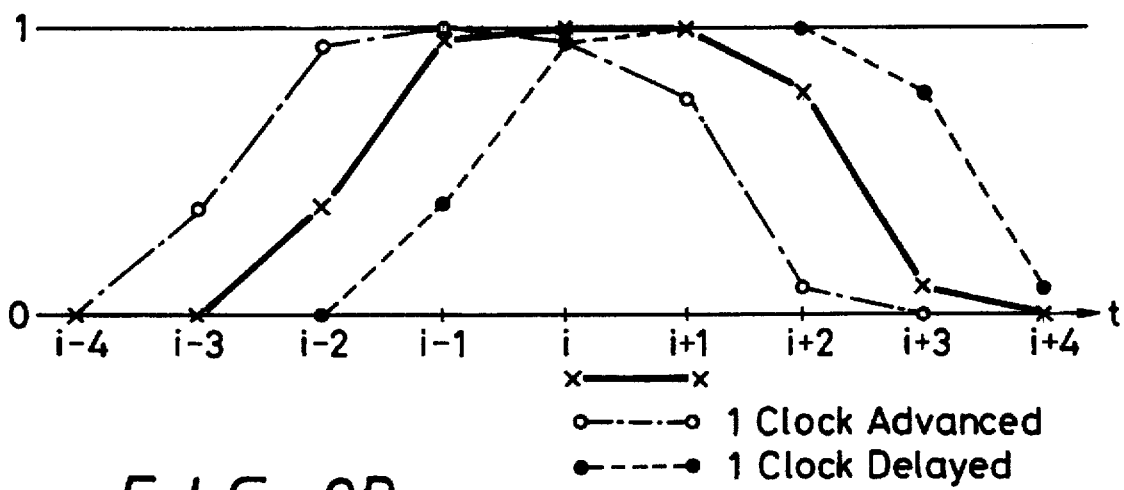
×———×
∘—·—∘ 1 Clock Advanced
●----● 1 Clock Delayed
FIG. 9B  Limiter Curre
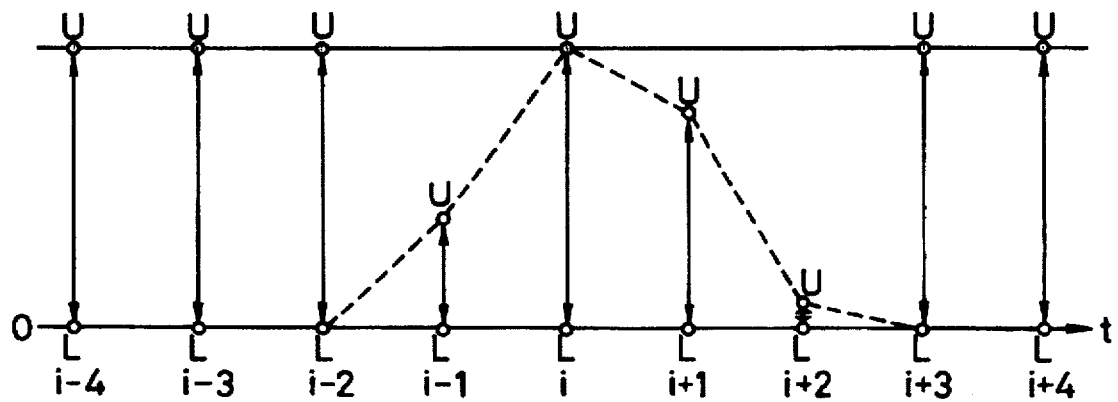
FIG. 9C  Limiter Curre Obtained After Processed by NAM

FIG. 10 (PRIOR ART)
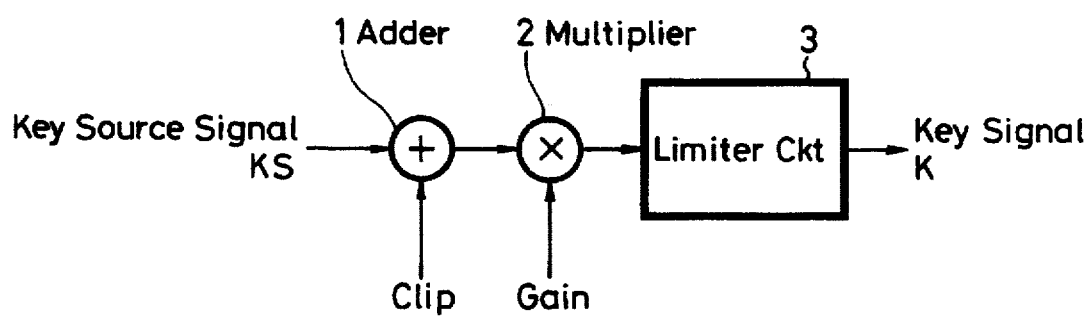
FIG. 11A (PRIOR ART) Key Source Signal
FIG. 11B (PRIOR ART) Key Signal
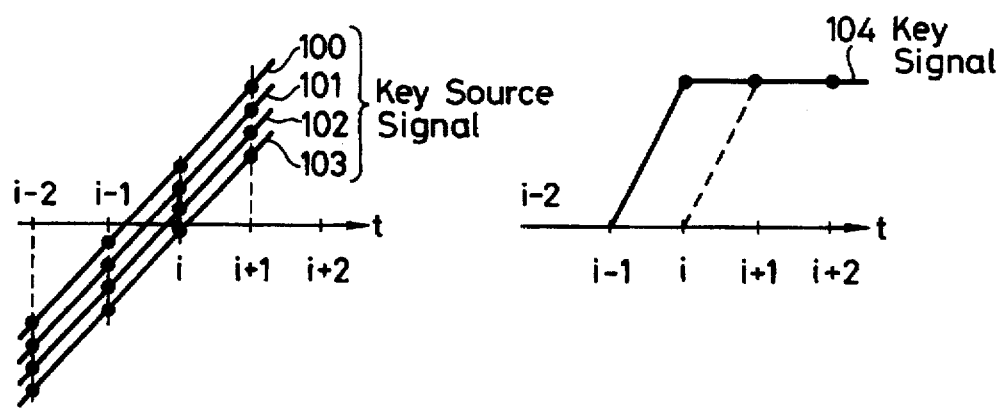

KEY SIGNAL WAVEFORM SHAPING APPARATUS

BACKGROUND OF THE INVENTION

1. Field of the Invention

The present invention relates generally to a key signal waveform shaping apparatus and in particular to an apparatus for waveform-shaping a key signal used when video signals are synthesized by a switcher.

2. Description of the Related Art

In the editing process of a video signal, a video signal supplied from a proper video signal source, such as a video camera, is supplied to a video special effect apparatus (Digital Video Effector, referred to hereinafter as "DVE"). The DVE is an apparatus for producing a video special effect on the video signal.

The video signal on which the video special effect is produced by the DVE is supplied to a switcher. A video output signal synthesized by the switcher is supplied to a recording VTR and thereby recorded on a video tape. Thus, a video tape with the video special effect is completed.

The DVE includes a frame memory to produce a video special effect on a video signal. The frame memory can produce video special effects, such as zooming, multi-image effect (e.g., a 9-image effect), monotone, white balance adjustment, mosaic, after-image effect, strobe action or still picture.

Zoom is used to magnify a part of the image on the whole of the picture screen. The multi-image effect is used to divide a single picture into nine pictures and to display the reduced-scale nine pictures simultaneously. Monotone is used to make a color picture become a black and white picture. White balance adjustment is used to process a video signal such that a portion that should be displayed white originally is displayed white. Mosaic is used to form a mosaic picture. After-image effect is used to form a residual image. Strobe action is used to stop a moving picture at a predetermined interval. Still picture is used to temporarily store image information of a particular frame of a moving picture and to read and output the image information from the frame memory.

The video signal with the video special effect is supplied to a switcher. The switcher synthesizes a video signal to the video signal with the video special effect by wipe, mix or the like. Using the wipe technique, while wiping a certain image with a particular pattern or erasing a certain image from the picture screen, another image is simultaneously inserted into the image. Using the mix technique, while a certain image is faded-out, another image is simultaneously faded-in. A video signal thus synthesized by the switcher is supplied to a recording VTR.

The DVE outputs the video signal with the video special effect and a key signal. The key signal is used to set a shape or the like of a synthesized image when the video signal with the video special effect is synthesized with another video signal by the switcher.

The video signals from the video cameras are C1, C2. Then, the video signal C2 is selected as a key source signal and supplied to the DVE. The video signal processed with the video special effect by the DVE and a key signal K formed from the key source signal are supplied to the switcher.

In the switcher, the video signal C1 that was selected as a background signal is added to the key signal K supplied from the DVE by an adder. The video signal and the key signal added with the background signal are supplied to a keyer.

In the keyer, the video signal and the key signal with the background signal are multiplied with constants K and 1−K by multipliers where $0 \leq K \leq 1$. Then, the adder adds the video signal and the key signal with the background signal after they have been multiplied with the constants by the multipliers. The adder then outputs an added output.

The key signal will be described herein. The video signal C2 is supplied to the DVE where it is processed in a video special effect fashion. On the other hand, the key signal is synthesized with a background portion by the video signal C1 selected as the background signal and obtained as the key signal whose background portion is processed. Then, the video signal processed with a video special effect and the key signal whose background portion is processed are synthesized to produce a video signal of a synthesized picture.

When the key signal is formed from a key recorded material such as the key source signal serving as the video signal, it is customary that a signal is clipped, extended by application of a gain and then limited.

FIG. 10 shows a conventional key signal waveform shaping circuit. As shown in FIG. 10, a key source signal KS serving as a video signal is supplied to an adder 1. The adder 1 is a clipping circuit for offsetting the key source signal KS by a predetermined clipping value. The key source signal KS offset by the adder 1 is supplied to a multiplier 2. The multiplier 2 is a gain circuit for extending the key source signal KS by multiplying the offset key source signal KS with a predetermined gain.

The key source signal KS extended by the multiplier 2 is supplied to a limiter circuit 3. The limiter circuit 3 is a limiter for generating a key signal K by cutting the key source signal KS extended by the multiplier 2 by an upper limit value and a lower limit value.

FIG. 11A is a diagram showing conventional key source signals. If key source signals 100, 101, 102 and 103 are multiplied with a gain of a certain magnitude by the multiplier 2, then the signals are extended upward as shown in FIG. 11B, so that all signals of one clock ranging from i−1 to i become key signals. FIG. 11B shows a conventional key signal. An error of one clock at maximum occurs as shown by a solid line and a dotted line in FIG. 11B.

As described above, in the case of the digital signal, only data produced at sample points are processed so that, if the gain is progressively increased, then the key signal rises during a period within one clock with the result that a maximum edge position error of one clock occurs. Moreover, since the key signal has a steep edge, an aliasing distortion (i.e., sampling noise) occurs with the result that picture frame is emphasized on the picture screen, causing a ringing. As a result, the quality of the synthesized picture is degraded.

Since the conventional key signal waveform circuit treats only data at the sampling point, if the gain is increased, then the key signal rises within one clock. There is then the disadvantage that a maximum error of the edge position of one clock occurs.

Moreover, since the key signal has a steep edge, an aliasing distortion occurs with the result that an edge of a picture is emphasized on the picture screen, resulting in a ringing. As a result, the quality of the synthesized picture is degraded.

In view of the above-described problems of the conventional waveform shaping circuit, it is an object of the present invention to provide a key signal waveform shaping apparatus wherein the error of an edge position of a key signal can be avoided so that the quality of a synthesized picture can be improved.

SUMMARY OF THE INVENTION

A key signal waveform shaping apparatus according to the present invention includes, as shown in FIGS. 1 to 5, an offset means 1 for supplying a key source signal KS with a gain of a predetermined slice level which becomes a reference of a key signal K, an extending means 2 for extending a signal offset by the offset means 1 by application of a gain and a limiter means 3 for converting the signal extended by the extending means 2 into a key signal by cutting an upper limit value and a lower limit value. The key signal waveform shaping apparatus includes an over-sampling means 20 for over-sampling the signal offset by the offset means 1, a hard key processing means 21 for making a one-bit hard key from the signal over-sampled by the over-sampling means 20, a low-pass filter 22 for smoothing the hard key made by the hard key processing means 21, a down-sampling means 23 for down-sampling the signal smoothed by the low-pass filter 22, a judging means 25 for judging whether the signal down-sampled by the down-sampling means 23 is the upper limit value or lower limit value, and a second limiter means 4 using the upper limit value and the lower limit value judged by the judging means 25.

Further, the key signal waveform shaping apparatus according to this invention includes, as shown in FIGS. 1 to 5, a nonadditive mixing means 57 for outputting a maximum value or minimum value among the signal down-sampled by the down-sampling means 23 and the signals which result from delaying the signal by delay means 58, 59, 60 by predetermined delay times. An output signal from the nonadditive mixing means 57 is supplied to the judging means 25 and the second limiter means 4.

A key signal waveform shaping apparatus according to this invention further includes, as shown in FIGS. 1 to 5, a second offset means 6 for supplying the key source signal KS with a gain of a predetermined slice level which becomes a reference of the key signal K. A signal offset by the second offset means 6 is supplied to the over-sampling means 20.

According to the present invention, the key signal waveform shaping apparatus includes the over-sampling means 20 for over-sampling the signal offset by the offset means 1, the hard key processing means 21 for generating a one-bit hard key from the signal over-sampled by the over-sampling means 20, the low-pass filter 22 for smoothing the hard key formed by the hard key processing means 21, the down-sampling means 23 for down-sampling the signal smoothed by the low-pass filter 22, the judging means 25 for judging whether the signal down-sampled by the down-sample means 23 is the upper limit value or lower limit value, and the second limiter means 4 using the upper limit value and lower limit values judged by the judging means 25. Therefore, since the resultant error is reduced to a reciprocal number of a predetermined multiple by the over-sampling of a predetermined multiple, the error of the edge position of the key signal K can be reduced and the steep leading edge of the key signal K can be suppressed so that the ringing in the synthesized picture is decreased, and the quality of the synthesized picture is improved. Further, since there are two stages of limiters, when the gain applied t the key source signal is sufficiently small, even if the signal is limited by the two limiters, then the edge of the key signal can be prevented from being affected with the result that soft keying can be carried out.

According to the present invention, the key signal waveform shaping apparatus includes the nonadditive means 57 for outputting a maximum value or minimum value among the signal down-sampled by the means 23 and the signals which result from delaying the signals by the delay means 58, 59, 60 by the predetermined delay times and the output signal of the nonadditive mixing means 57 are supplied to the judging means 25 and the second limiter means 4. The edge position of the key signal K is then shifted in the time axis direction by the nonadditive mixing means 57.

Further, according to the present invention, the key signal waveform shaping apparatus includes the second offset means 6 for supplying the key source signal KS with the gain of the predetermined slice level which becomes the reference of the key signal K. The signal offset by the second offset means 6 is supplied to the over-sampling means 20. The offset means 6 for clipping is provided separately so that the key source signal KS can be offset to the arbitrary value.

BRIEF DESCRIPTION OF THE DRAWINGS

FIGS. 4A-4C are waveform diagrams showing an operation of the key signal waveform shaping apparatus according to the first embodiment of the present invention.

FIGS. 7A-7C are diagrams showing disadvantages brought about when the key signal is generated as the key signal of the single-side type key signal in the key signal waveform shaping apparatus according to the second embodiment of the present invention.

FIGS. 9A-9C are diagrams showing how to correct the disadvantage brought about when the key signal is generated as the key signal of the single-side type key signal in the key signal waveform shaping apparatus according to the second embodiment of the present invention.

FIG. 10 is a diagram showing a conventional key signal waveform shaping circuit.

FIGS. 11A-11B are diagrams used to explain an operation of the conventional key signal waveform shaping circuit of FIG. 10.

DETAILED DESCRIPTION OF THE PREFERRED EMBODIMENTS

In the key signal waveform shaping apparatus of the present invention, a resultant error can be reduced to a reciprocal number of a predetermined multiple by the over-sampling of the predetermined multiple. Therefore, the error of the edge position of the key signal can be decreased and the steep leading edge of the key signal can be suppressed.

As a result, the ringing in the synthesized picture can be decreased and the quality of the synthesized, picture improved.

Figure 1:
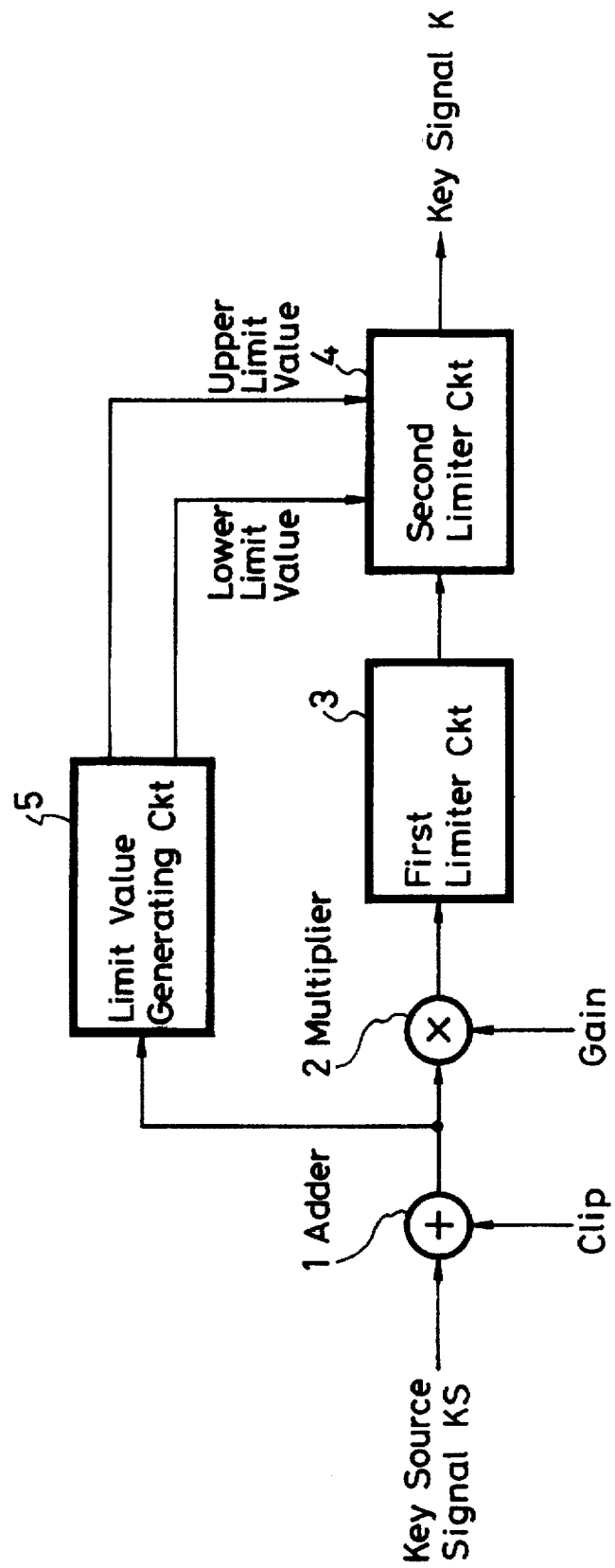
FIG. 1 is a block diagram showing a key signal waveform shaping apparatus according to a first embodiment of the present invention.

FIG. 1 is a block diagram showing an arrangement of a key signal waveform shaping apparatus according to an embodiment of the present invention, wherein like parts corresponding to those of the conventional key signal waveform shaping apparatus shown in FIG. 10 are marked with the same reference numerals and therefore need not be described in detail. As shown in FIG. 1, the key source signal KS serving as the video signal is supplied to the adder 1. The adder 1 is the clip circuit for offsetting the key source signal KS by a predetermined clip value. The key source signal KS offset by the adder 1 is supplied to the multiplier 2. This multiplier 2 is the gain circuit for extending the key source signal KS by multiplication of a predetermined gain.

The key source signal KS extended by the multiplier 2 is supplied to the first limiter circuit 3. The first limiter circuit 3 is a static limiter for forming an output signal by cutting off the key source signal KS extended by the multiplier 2 at a fixed upper limit value and lower limit value.

The inventive key signal waveform shaping apparatus shown in FIG. 1 differs from the conventional key signal waveform shaping apparatus shown in FIG. 10 in that the key source signal KS offset by the adder 1 is supplied to the limit value generating circuit 5. The limit value generating circuit 5 generates a variable upper limit value U and a variable lower limit value L. The variable upper limit value U and the variable lower limit value L are supplied to a second limiter circuit 4 which generates the key signal K on the basis of the output supplied thereto from the first limiter circuit 3.

The second limiter circuit 4 is a dynamic limiter for further limiting the output of the first limiter circuit 3 by using a limit value generated by the limit value generating circuit 5. In this case, if the variable upper limit value U is fixed to "1" and the variable lower limit value L is fixed to "0", then the second limiter circuit 4 becomes equivalent to the first limiter circuit 3. The limit value generating circuit 5 has a function to prevent all of the key source signals KS from becoming the key signals K to thereby preserve the key edge position when the gain increases progressively.

While the output of the second limiter circuit 4 is used as the key signal K, as described above, the present invention is not limited thereto. The output of the second limiter circuit 4 may be supplied to a key inverting circuit (not shown) which outputs the key signal K as K when the key inverting processing is turned off and which outputs the key signal K as 1−K when the key inverting processing is turned on, where 0≦K≦1.

Figure 2:
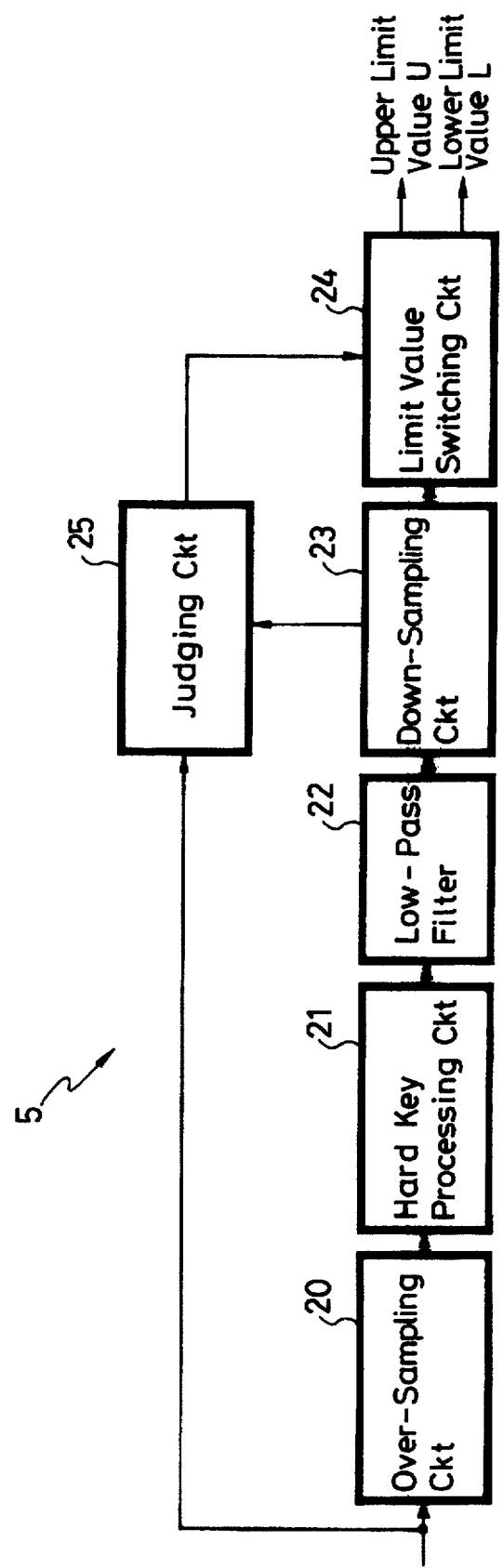
FIG. 2 is a block diagram of a limit value generating circuit used in the key signal waveform shaping apparatus according to the first embodiment of the present invention.

FIG. 2 is a block diagram showing the limit value generating circuit 5 used in the key signal waveform shaping apparatus according to the embodiment of the present invention. As shown in FIG. 2, the key source signal KS offset by the adder 1 is supplied to an over-sampling circuit 20. The key source signal KS over-sampled by the over-sampling circuit 20 is supplied to a hard key processing circuit 21. The hard key processing circuit 21 converts the key source signal KS over-sampled by the over-sampling circuit 20 into a one-bit key signal.

The one-bit key signal converted by the hard key processing circuit 21 is supplied to a low-pass filter 22. The low-pass filter 22 is adapted to smooth the one-bit key signal converted by the hard key processing circuit 21 to a limit signal which is a soft key signal. The limit signal smoothed as the soft key signal by the-low-pass filter 22 is supplied to a down-sampling circuit 23. The down-sampling circuit 23 reconverts the over-sampled signal into a limit signal with the original sampling rate. The limit signal with the original sampling rate from the down-sampling circuit 23 is supplied to a limit value switching circuit 24.

The key source signal KS offset by the adder 1 is also supplied to a judging circuit 25. The judging circuit 25 determines on the basis of the magnitude of the key source signal KS whether the limit signal generated by the down-sampling circuit 23 is used by the second limiter circuit 4 as variable the upper limit value U or variable lower limit value L. Then, the judging circuit 25 supplies a control signal to the limit value switching circuit 24.

The limit value switching circuit 24 supplies the key signal K thus generated to the second limiter circuit 4 as the variable upper limit value U or variable lower limit value L under the control of the control signal supplied thereto from the judging circuit 25. The limit value switching circuit 24 sets the lower limit value L to 1"0" when the generated limit signal is used as the upper limit value U, and sets the up limit value U to "1" when the resultant limit signal is use as the lower limit value L.

Figure 3:
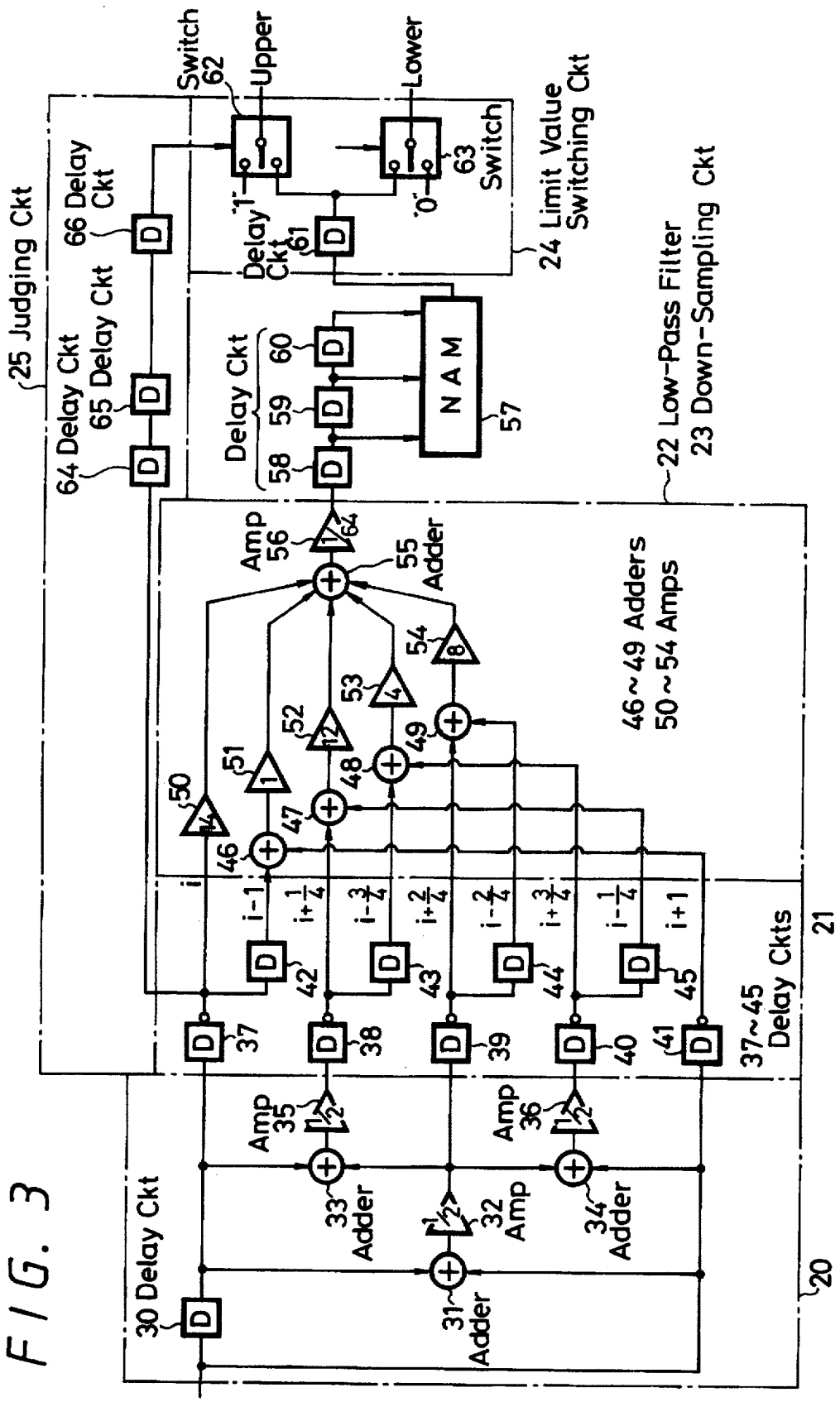
FIG. 3 is a circuit diagram showing a limit value generating circuit used in the key signal waveform shaping apparatus according to the first embodiment of the present invention.

FIG. 3 is a circuit diagram of the limit value generating circuit used in the key signal waveform shaping apparatus according to the first embodiment of the present invention. As shown in FIG. 3, the offset key source signals KS is supplied to one input terminal of an adder 31 provided within the over-sampling circuit 20. The offset key source signal KS is also supplied to the other input terminal of the adder 31 through a delay circuit 30. An output of the adder 31 is supplied to an amplifier 32 having a coefficient of ½.

The offset key source signals KS is also supplied to one input terminal of an adder 34. The output of the amplifier 32 is supplied to the other input terminal of the adder 34. The offset key source signal KS is also supplied through the delay circuit 30 to one input terminal of an adder 33. The output from the amplifier 32 is supplied to the other input terminal of the adder 33. Outputs of the adders 33, 34 are respectively supplied to amplifiers 35, 36 each having a coefficient of ½. The offset key source signal KS is supplied, directly and through the delay circuit 30, to the hard key processing circuit 21. The outputs of the amplifiers 35, 36 each having a coefficient of ½, are also supplied to the hard key processing circuit 21.

The offset key source signal KS, the offset key source signal KS supplied through the delay circuit 30, and the outputs of the amplifiers 35, 36, each having the coefficient of ½, are respectively supplied to delay circuits 37, 38, 39, 40 and 41 provided within the hard key processing circuit 21. The delay circuits 37, 38, 39, 40 and 41 output inverted signals. The inverted output of the delay circuit 37 is supplied to a delay circuit 42. The inverted output of the delay circuit 38 is supplied to a delay circuit 43. The inverted output of the delay circuit 39 is supplied to a delay circuit 44. The inverted output of the delay circuit 40 is supplied to a delay circuit 45. The outputs from the delay circuits 42, 43, 44, 45 and 41 are supplied to the low-pass filter 22 and the down-sampling circuit 23.

The output from the delay circuit 37 is supplied to the low-pass filter 22 and to an amplifier 50 having a coefficient of 14 provided within the down-sampling circuit 23. The output from the delay circuit 42 is supplied to one input terminal of an adder 46. The output from the delay circuit 41 is supplied to the other input terminal of the adder 46. The output from the delay circuit 38 is supplied to one input terminal of an adder 47, and the output from the delay circuit 45 is supplied to the other input terminal of the adder 47. The output from the delay circuit 43 is supplied to one input terminal of an adder 48, and the output from the delay circuit 40 is supplied to the other input terminal of the adder 48. The output from the delay circuit 39 is supplied to one input terminal of an adder and the output from the delay circuit 44 is supplied to the other input terminal of the adder 49.

An output from the adder 46 is supplied to an amplifier 51 having a coefficient of 1. An output from the adder 47 is supplied to an amplifier 52 having a coefficient of 12. An output from the adder 48 is supplied to an amplifier 53 having a coefficient of 4. An output from the adder 49 is supplied to an amplifier 54 having a coefficient of 8. An output from the amplifier 50 having the coefficient of 14, an output from the amplifier 51 having the coefficient of 1, an output from the amplifier 52 having the coefficient of 12, an output from the amplifier 53 having the coefficient of 4, and an output from the amplifier 54 having the coefficient of 8 are supplied to an adder 55. An output from the adder 55 is supplied to an amplifier 56 having a coefficient of 1/64. The low-pass filter 22 is a symmetrical type 9-tap FIR digital filter using a coefficient of 1/64 (1, 4, 8, 12, 14 12, 8, 4, 1).

An output from the amplifier 56 having the coefficient of 1/64 is supplied through a delay circuit 58 to a NAM circuit 57 and then supplied to a delay circuit 59. An output from the delay circuit 59 is supplied to the NAM circuit 57 and a delay circuit 60. An output from the delay circuit 60 is supplied to the NAM circuit 57. The NAM circuit 57 is a nonadditive mixing circuit for outputting a maximum value or minimum value of the input.

In this embodiment, the edge position of the limit signal K can be shifted by using, in particular, the NAM circuit 57. The NAM circuit 57 in this embodiment can take a maximum or minimum value between the limit signal K and a signal advanced or delayed from the limit signal K by one clock. The limit signal K may be output as it is without using the NAM circuit 57. In this case, the NAM circuit 57 is used in order to make only the signal of the upper direction from the clipping position become the key signal K, and an operation of the second limiter circuit 4 is changed in response to this key signal K.

The output of the NAM circuit 57 is supplied to a delay circuit 61 provided within the limit value switching circuit 24. An output from the delay circuit 61 is supplied to one terminal of a switch 62 and one terminal of a switch 63. The switch 62 is supplied at the other terminal thereof with "1". The switch 63 is supplied at the other terminal thereof with "0".

However, the inverted output from the delay circuit 37 provided within the hard key processing circuit 21 is supplied to the delay circuits 64, 65, and 66 provided within the judging circuit 25. An output from the delay circuit 66 is supplied to the switches 62, 63 of the limit value switching circuit 24 as a switching signal. The switches 62, 63 output the upper limit value U and the lower limit value L.

FIG. 4 is a waveform diagram showing an operation of the key signal waveform shaping apparatus according to the embodiment of the present invention. FIG. 4A is a diagram showing an over-sampling. FIG. 4B is a diagram showing a one-bit hard key. FIG. 4C is a diagram showing the upper limit value and the lower limit value. In FIG. 4A, reference symbols i−1, i, and i+12 depict sampling points. Reference symbols xi−1, xi, and xi+1 depict sample data, respectively. Reference symbols yi−¾, yi−2/4, yi−1/4, yi+1/4, Yi+2/4, and yi+3/4 depict data which are made by the over-sampling, respectively. In this embodiment, the over-sampling uses four-times linear interpolation. Specifically, three data are interpolated between the original data of the sampling points.

In FIG. 4B, the one-bit hard key shown by a solid line is generated from over-sampled data. In this embodiment, a signal which results from inverting a code bit is used as the one-bit hard key. If the signal shown in FIG. 4A is used, then it is possible to obtain a key signal which rises from the over-sampling points i−2/4 to i−1/4. A signal shown by a dotted line is a signal which results from smoothing the one-bit hard key with the low-pass filter 22.

Whether the thus generated limit signal is used as an upper limit value or a lower limit value of the limiter is judged based on the magnitude of the offset key source signal. In this embodiment, the inverted signal of the code bit of the offset key source signal is directly used as a control signal of the judged result.

If the control signal is "1", then the generated limit signal has the upper limit value U, and the lower limit value L is set to "0". Conversely, if the control signal is "0", then the upper limit value U is set to "1", and the generated limit signal is used as the lower limit value L. In FIG. 4C, at the sampling point i−1, the control signal is set to "0", the upper limit value U is set to "1", and the generated limit signal is used as the lower limit value L. At the sampling point i, the control signal is set to "1", the thus generated limit signal is used as the upper limit value U, and the lower limit value L is set to "0". Similarly, at the sampling point i+1, the control signal is set to "1", the generated limit signal is used as the upper limit value U, and the lower limit value L is set to "0".

While the inverted signal of the code bit of the offset key source signal KS is directly used as the control signal of the judged result as described above, the present invention is not limited to this example. The function of this embodiment can be de-energized by fixing the upper limit value U to "1" and the lower limit value L to under the control of a control signal supplied from an external CPU.

With the above-mentioned arrangement, it is possible to reduce an error in the edge position of the key signal K. When the over-sampling of N times, for example, is used, it is possible to reduce an error to 1/N where N is a natural number.

Since the steep leading edge of the key signal K can be suppressed, the ringing in the synthesized picture can be decreased and, therefore, the quality of the synthesized picture can be improved.

Further, because the limiters are provided in two stages, if the given gain is sufficiently small, then the key source signal is limited by the two limiters. Therefore, the edge of the key signal K can be prevented from being affected by the function of this embodiment with the result that a soft keying can be carried out.

Figure 5:
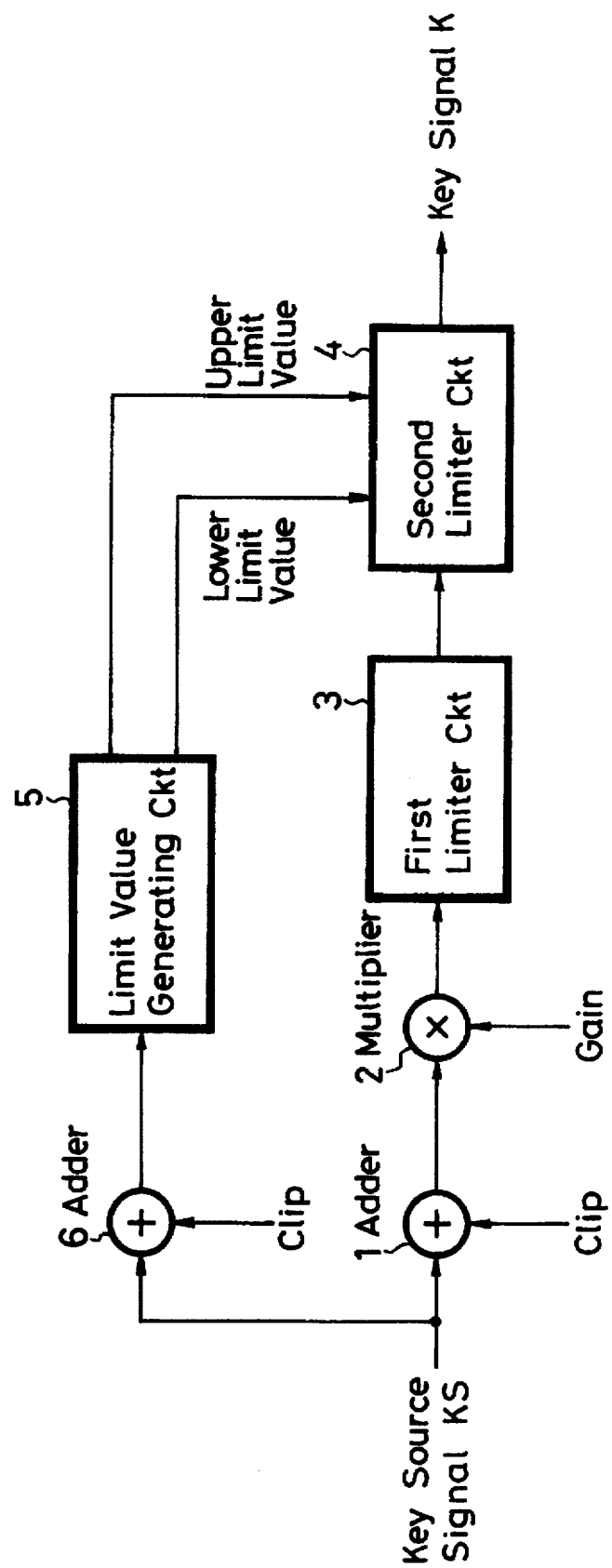
FIG. 5 is a block diagram showing a key signal waveform shaping apparatus according to a second embodiment of the present invention.

FIG. 5 is a block diagram showing the key signal waveform shaping apparatus according to a second embodiment of the present invention. The key signal waveform shaping apparatus shown in FIG. 5 differs from that of FIG. 1 only in that an adder (clipping circuit) 6 is provided as a second offset means. The rest of the arrangement is similar to that of FIG. 1 and therefore need not be described in detail. According to this arrangement, the key source signal KS can be offset to an arbitrary value.

Figure 6A:
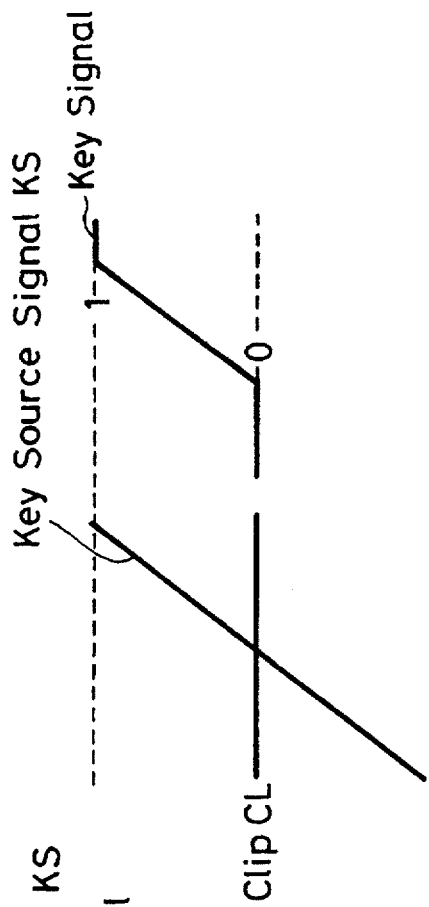
FIGS. 6A-6B are diagrams used to explain a key signal used in the key signal waveform shaping apparatus according to the second embodiment of the present invention.
Figure 6B:
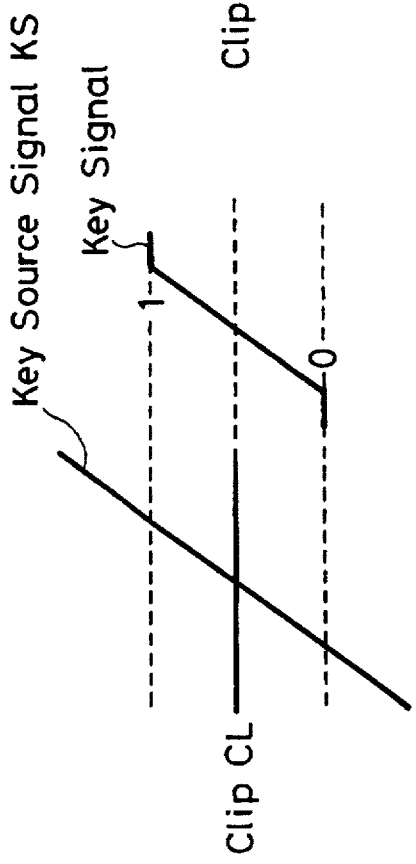

FIG. 6 is a diagram used to explain the key signal of the key signal waveform shaping apparatus according to the second embodiment of the present invention. FIG. 6A shows a key signal of double-side type, and FIG. 6B shows a key signal of a single-side type. The key signal K can be formed into the double-side type or single-side type by varying the gain. As shown in FIG. 6A, the key signal K of the double-side type is generated between "0" and "1" of both sides of the upper and lower direction indicative of the output value of a clipping position CL for the key source signal KS. As shown in FIG. 6B, the key signal K of the single-side type is generated between "0" and "1" for the key source signal KS where "0" is the position indicating the output value of the clipping position CL.

Although the error of the edge position decreases as the over-sampling becomes fine, the circuit scale of the low-pass filter increases. Therefore, in this embodiment, considering the circuit scale, over-sampling by 4 times is employed.

The foregoing description applies when the key signal K is of the double-side type. The reason for this is that the one-bit hard key is spread across both sides of the zero-cross point serving as the clipping point by the low-pass filter.

However, it is frequently observed that the key signal K is generated as a key signal of the single-side type. FIG. 7 is a diagram showing disadvantages brought about when the key signal K is generated as a key signal of the single-side type in the key signal waveform shaping apparatus according to the second embodiment of the present invention. FIG. 7A shows an offset key source signal, FIG. 7B shows a limiter signal, and FIG. 7C shows a key signal.

In FIG. 7B, a signal shown by mark crosses (x's) is an output from the limit value generating circuit, and a signal shown by open circles (°'s) is an output from the first limiter circuit. While the upper limit value and lower limit value are respectively "1" and "0" at sampling points i−4, i−3, i−2, and i−1, at sampling point i, the upper limit value is "1" and the lower limit value becomes the output from the limit value generating circuit and is limited so as not to be lowered. At sampling points i+1, i+2, and i+3, the maximum value is "1" and the lower limit value becomes the output from the first limiter circuit. An consequence, as shown in FIG. 7C, the key signal fluctuates only at the sampling point i.

Figure 8:
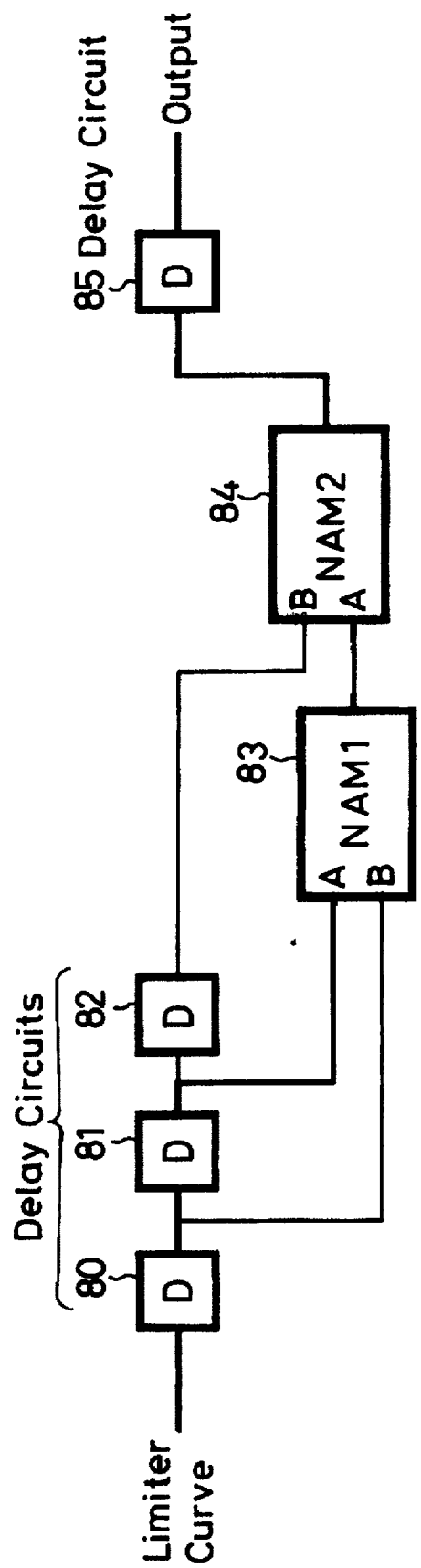
FIG. 8 is a diagram showing NAM circuits used in the key signal waveform shaping apparatus according to the second embodiment of the present invention.

In order to obtain a more satisfactory key signal which can be prevented from fluctuating, there is provided the following circuit. FIG. 8 is a diagram showing NAM circuits used in the key signal waveform shaping apparatus according to the second embodiment of the present invention. The NAM circuits shown in FIG. 8 correspond to the NAM circuit shown in FIG. 3. In FIG. 8, a limiter curve is supplied to a delay circuit 80. An output from the delay circuit 80 is supplied to a B terminal of a first NAM circuit 83 and a delay circuit 81. An output from the delay circuit 81 is supplied to an A terminal of the first NAM circuit 83 and a delay circuit 82. An output from the first NAM circuit 83 is supplied to an A terminal of a second NAM circuit 84. An output from the delay circuit 82 is supplied to a B terminal of the second NAM circuit 84. An output from second NAM circuit 84 is supplied to a delay circuit 85. An output from the delay circuit 85 is supplied to the limit value switching circuit 24 shown in FIG. 3, for example.

In this circuit arrangement, when the key signal is formed as a key signal of the double-side type, main-line data shown by a bold line in FIG. 8 is output as it is. When the key signal is formed as a key signal of the single-side type, the main-line data and data provided before and after the main-line data are processed in a negative NAM fashion, i.e., if the output from the first NAM circuit 83 is set to the minimum value, then the output from the second NAM circuit 84 also is set to the minimum value to shift the limiter curve to the inside to thereby prevent the disadvantage of the key signal shown in FIG. 7C.

FIG. 9 is a diagram showing how to correct a limiter curve when the key signal is generated as a key signal of the single-side type in the key signal waveform shaping apparatus according to the second embodiment of the present invention. FIG. 9A shows an offset key source signal and a hard key, FIG. 9B shows a limiter curve, and FIG. 9C shows a limiter curve obtained after the NAM processing. In FIG. 9B, cross marks (x's) on a solid line represent a limiter curve, obtained when the key signals are of the same phase, open circles (°'s) on a one-dot chain line represent a limiter curve obtained when the key signal is advanced by one clock, and solid circles (●'s) on a dotted line represent a limiter curve obtained when the key signal is delayed by one clock.

At that time, in the limiter curve obtained after the NAM processing as shown in FIG. 9C, the upper limit value and the lower limit value are "1" and "0" at the sampling points i−4, i−3, and i−2, respectively, as shown in FIG. 9C. At the sampling points i−1 and i, the upper limit value is a value of a one clock-delayed limiter curve and the lower limit value is "0" At the sampling points i+1 and i+2, the maximum value is "1" and the lower limit value becomes the output of the first limiter circuit. The upper limit value is a value of a one clock-advanced limiter curve and the lower limit value is "0". The upper limit value and the lower limit value are respectively "1" and "0" at the sampling points i+3 and i+4. In this way, the limiter curve can be corrected by shifting the limiter curve to the inside.

According to the foregoing embodiment, in FIGS. 1 and 2, the present invention includes the over-sampling circuit 20 which serves as the over-sampling means for over-sampling the signal offset by the adder (clipping circuit) 1, which is the offset means. The hard key processing circuit 21 serves as the hard key processing means for generating the one-bit hard key from the signal which is over-sampled by the over-sampling circuit 20. The low-pass filter 22 smoothes the hard key made by the hard key processing circuit 21 which serves as the hard key processing means. The down-sampling circuit 23 serves as the down-sampling means for down-sampling the signal smoothed by the low-pass filter 22. The judging circuit 25 serves as the judging means for judging whether the signal down-sampled by the down-sampling circuit 23 is the upper limit value or lower limit value. The second limiter circuit 4 serves as the second limiter means using the upper limit value and the lower limit value judged by the judging circuit 25. Accordingly, the resultant error can be reduced to a reciprocal number of a predetermined multiple by an over-sampling of a predetermined of multiple. Therefore, the error of the edge position of the key signal K can be decreased and the steep leading edge of the key signal K can be suppressed. Thus, the ringing in the synthesized picture can be reduced, and the quality of the synthesized picture can be improved. Further, because there are two stages of limiters, if the gain given to the key source signal KS is sufficiently small, then the edge of the key signal K can be substantially prevented from being affected by this function so that the soft keying can be carried out.

According to this embodiment, in FIG. 3, the limit value generating circuit includes the NAM circuit 57 which serves as the nonadditive mixing means for outputting the maximum value or minimum value among the signal down-sampled by the down-sampling circuit 23. The signal which results from delaying the signal by the delay circuits 58, 59 and 60 by the predetermined delay times and the output signal from the NAM circuit 57 which serves as the nonadditive mixing means is supplied to the judging circuit 25 and the second limiter circuit 4. Accordingly, the edge position of the key-signal K can be shifted to the time axis direction by the NAM circuit 57 serving as the nonadditive mixing means.

Further, in FIG. 5, the key signal waveform shaping apparatus includes the adder (clipping circuit) 6 which serves as a second offset means for supplying the key source signal KS with the gain of the predetermined slice level which becomes the reference to the key signal K. The signal offset by the adder (clipping circuit) 6 which serves as the second offset means is supplied to the over-sampling circuit 20. The above-mentioned apparatus includes separately the adder (clipping circuit) 6 serving as the offset means for clipping the signal level. Therefore, the key source signal KS can be offset to the arbitrary value.

According to the above-mentioned embodiment, since the present invention includes the over-sampling means for over-sampling the signal offset by the offset means, the hard key processing means for generating the one-bit hard key from the signal over-sampled by the over-sampling means, the low-pass filter for smoothing the hard key made by the hard key processing means, the down-sampling means for down-sampling the signal smoothed by the low-pass filter, the judging means for judging whether the signal down-sampled by the down-sampling means is the upper limit value or lower limit value, and the second limiter means using the upper limit value and the lower limit value judged by the judging means, the resultant error can be reduced to the reciprocal number of the predetermined multiple by the over-sampling of the predetermined multiple. Therefore, the error of the edge position of the key signal K can be decreased, and the steep leading edge of the key signal K can be suppressed. Thus, the ringing in the synthesized picture can be reduced and, therefore, the quality of the synthesized picture can be improved. Further, because the limiters are provided in two stages, if the gain given to the key source signal KS is sufficiently small, then the edge of the key signal K can be substantially prevented from being affected by this function so that the soft keying can be carried out.

According to the present invention, since the present invention includes the nonadditive mixing means for outputting the maximum value or minimum value among the signal down-sampled by the down-sampling means and the signals which result from delaying the signal by the delay means by the predetermined delay times, and the output signal from the nonadditive mixing means is supplied to the judging means and the second limiter means, the edge position of the key signal K can be shifted to the time axis direction by the nonadditive mixing means.

Further, according to the present invention since the key signal waveform shaping apparatus includes the second offset means for supplying the key source signal KS with the gain of the predetermined slice level which becomes the reference to the key signal K, and the signal offset by the second offset means is supplied to the over-sampling means, the above-mentioned apparatus includes separately the offset means for clipping the signal level. Therefore, the key source signal can be offset to the arbitrary value.

What is claimed is:

1. An apparatus for shaping a key signal waveform having offset means for giving a gain of a predetermined slice level, to a key source signal supplied to the offset means to generate an offset signal, extending means for extending the offset signal by multiplication of a gain to generate an extended offset signal, and first limiter means for limiting the extended offset signal by cutting upper and lower portions of the key source signal to generate a limited signal, said apparatus comprising:

over-sampling means for over-sampling said offset-signal sampled at an original sampling rate to generate an oversampled signal;

hard key processing means for producing a one-bit hard key signal having a steep edge portion from the over-sampled signal;

a low-pass filter for smoothing said hard key signal;

down-sampling sampling means for down-sampling the signal smoothed by said low-pass filter so as to reconvert the oversampled signal into a down-sampled signal with said original sampling rate;

judging means for judging whether the level of the down-sampled signal is an upper limit value or a lower limit value at each original sampling period; and second limiter means for further limiting the level of said limited signal, which is supplied to said second limiter means, from said first limiter means, on the basis of said upper limit value or said lower limit value to generate said key signal.

2. The apparatus according to claim 1, further comprising non-additive mixing means connected to said down-sampling means for supplying a maximum value or minimum value among the down-sampled signal, and the down-sampled signal being delayed by delay means by a predetermined delay time to said second limiter means as a signal corresponding to said upper limit value or said lower limit value.

3. The apparatus according to claim 1, further comprising second offset means for giving a gain of a predetermined slice level to said key source signal and for supplying an offset signal derived from said gain to said over-sampling means so that said key source signal can be offset to an arbitrary value without regard to said second offset means.

4. The apparatus according to claim 1, wherein said first limiter means includes a static limiter for forming a signal outputted from said first limiter means by cutting upper and lower portions of the signal extended by said extending means with a fixed upper limit value and a fixed lower limit value; and wherein said second limiter means includes a dynamic limiter for limiting the signal formed by the static limiter in response to a variable upper limit value or a variable lower limit value each supplied to said second limiter means.

5. The apparatus according to claim 1, wherein said judging means judges said limit values based on a magnitude of said key source signal.

6. The apparatus according to claim 1, further comprising switching means supplied with the down-sampled signal from said down-sampling means for switching said upper and lower limit values supplied to said second limiter means to a predetermined limit value used in said first limiter means in response to a control signal from said judging means.

7. The apparatus according to claim 6, wherein said control signal corresponds to an inverted signal of a code bit of said offset signal.

8. The apparatus according to claim 1, wherein said over-sampling means samples said offset signal by using four-times liner interpolation.

9. An apparatus for shaping a key signal waveform comprising:

offset means for giving a gain of a predetermined slice level, which becomes a reference to a key signal, to a key source signal supplied to said offset means;

extending means for extending the key source signal offset by said offset means by multiplication of a gain;

first limiter means for forming an output signal by cutting upper and lower portions of the key source signal extended by said extending means with a fixed upper limit value and a fixed lower limit value;

limit value generating means for generating a variable upper limit value and a variable lower limit value on the basis of the key source signal supplied thereto from said offset means; and second limiter means for further limiting the output signal supplied thereto from said first limiter means in response to the variable upper limit value or the variable lower limit value so as to generate the key signal.

10. The apparatus according to claim 9, further comprising second offset means for giving a gain of a predetermined slice level to said key source signal and for supplying an offset signal derived from said gain to said over-sampling means so that said key source signal can be offset to an arbitrary value without regard to said second offset means.

11. The apparatus according to claim 9, wherein said limit value generating means generates said variable upper limit value and said variable lower limit value on the basis of the level of the key source signal and supplies said variable limit values and said fixed limit values to said second limiter means.

12. In a key signal waveform shaping apparatus including offset means for giving a gain of a predetermined slice level to a key source signal;

extending means for extending the signal offset by said offset means by multiplication of a gain; and limiter means for converting said signal into said key signal by cutting upper and lower portions of the signal; extended by said extending means, said key signal waveform shaping apparatus comprising:

over-sampling means for over-sampling said signal offset by said offset means;

hard key processing means for making a one-bit hard key from the signal over-sampled by said over-sampling means;

a low-pass filter for smoothing the hard key made by said hard key processing means;

down-sampling means for down-sampling a signal smoothed by said low-pass filter;

judging means for judging whether the signal down-sampled by said down-sampling means is an upper limit value or a lower limit value; and second limiter means using said upper limit value or lower limit value judged by said judging means.

13. A key signal waveform shaping apparatus according to claim 12, further comprising nonadditive mixing means for outputting a maximum value or minimum value among the signals down-sampled by said down-sampling means and a signal which results from delaying said signal by delay means by predetermined delay times, and wherein an output of said nonadditive mixing means is supplied to said judging means and said second limiter means.

14. A key signal waveform shaping apparatus according to claim 12, further comprising second offset means for giving a gain of a predetermined slice level, which becomes a reference to said key signal, to a key source signal, and wherein a signal offset by said second offset means is supplied to said over-sampling means.

* * * * *